United States Patent [19]

Shaw et al.

[11] 4,198,209

[45] Apr. 15, 1980

[54] PROCESS FOR THE LEACHING OF AP FROM PROPELLANT

[76] Inventors: Robert A. Frosch, Administrator of the National Aeronautics and Space Administration, with respect to an invention of Graham C. Shaw, Garland; Meldon J. McIntosh, North Ogden, both of, Utah

[21] Appl. No.: 946,990

[22] Filed: Sep. 29, 1978

[51] Int. Cl.² ............... C01D 1/30; B01J 17/00; C06B 25/02
[52] U.S. Cl. ............... 23/302 R; 149/108.4; 23/302 T; 23/300; 23/302 A
[58] Field of Search ............ 241/16, 17; 423/476; 23/299, 300, 302 R, 302 A, 302 T; 149/108.4; 252/351, 352, 353; 260/29.7 P, 29.7 SQ, 29.7 E, 29.7 WA

[56] References Cited

U.S. PATENT DOCUMENTS

| 2,595,797 | 5/1952 | Leyonmark | 260/29.7 SQ |
| 2,719,010 | 5/1950 | Erickson | 241/17 |
| 2,720,446 | 10/1955 | Whetstone | 23/300 X |
| 3,102,867 | 9/1963 | Buhle | 260/29.7 SQ |
| 3,451,789 | 6/1969 | McIntosh | 23/302 R |
| 3,770,390 | 11/1973 | Teot | 23/300 |

FOREIGN PATENT DOCUMENTS

| 662288 | 4/1963 | Canada | 23/302 |
| 49-11313 | 3/1974 | Japan | 23/300 |
| 153123 | 11/1920 | United Kingdom | 23/302 A |

Primary Examiner—Joseph Scovronek
Assistant Examiner—Chris Konkol
Attorney, Agent, or Firm—Wilfred Grifka; John R. Manning; Monte F. Mott

[57] ABSTRACT

Enhanced recovery of ammonium perchlorate from waste solid rocket propellant is effected by leaching shredded particles of the propellant with an aqueous leach solution containing a low concentration of surface active agent while stirring the suspension.

11 Claims, 2 Drawing Figures

PROCESS FOR THE LEACHING OF AP FROM PROPELLANT

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 24 USC 2457).

BACKGROUND OF THE INVENTION

1. Field of the Invention

The present invention relates to solid propellant disposal and recovery and, more particularly, to a method of recovering inorganic oxidizer salt from the waste propellant.

2. Description of the Prior Art

There is a considerable amount of waste propellant produced during the manufacture of solid propellant rocket motors, such as from the excess cast into the motor casing to compensate for shrinkage, from motors or masterbatches that do not meet specifications, as well as overage motors removed from service. Typically this waste propellant has been scrapped since the flammability and rubbery characteristics have been believed to prevent economical reclamation.

Large quantities of waste propellant have been and are now being burned in open burning pits. Due to increasing environmental pressure, many propellant producers are either now burning waste propellant and scrubbing the combustion gases or are planning on or will be required to so in the future.

The expected quantity of waste composite propellant from the U.S. Space Shuttle Solid Rocket Motor boosters from 1976 through 1989 is expected to be about $8 \times 10^6$ lb. The cost of burning waste propellant is considerable. Economic recovery of propellant ingredients would save energy, cost, reduce materials and eliminate the costly, undesirable and hazardous open burning or incineration procedure.

A method of removing, or leaching, ammonium perchlorate (AP) from composite propellants is taught in U.S. Pat. No. 3,451,789, by Meldon McIntosh. In this process, propellant removed from rocket motors is chopped into small chunks which are leached with water. However, the tacky nature of the composite propellants results in the formation of large agglomerates of propellant which prevent the necessary intermixing of water and propellant required for efficient extraction of the oxidizer. In order to obtain more than 25 to 30% of the available oxidizer the agglomerated propellant requires continuous tearing and chopping apart under the leach solution. This requires a large expenditure in time and power to run the chopper while extracting the AP.

SUMMARY OF THE INVENTION

An improved process for the reclamation of propellant ingredients from waste propellant has been provided in accordance with this invention. The process is economical, conserves energy and is ecologically appealing. Though open pit burning is inexpensive, the process of the invention becomes attractive because the presence of a large amount of uniform composition waste propellant lends itself to the design and construction of a plant of recover ingredients in a volume great enough to pay out the investment. Ingredient recovery just from the Space Shuttle waste propellant is expected to be worth over $1.5 million and should conserve over 100 million kwh of energy over the term of the Space Shuttle Program.

The present invention recovers oxidizer in an aqueous leach suspension containing an additive which modifies the propellant surface thereby providing a method of preventing the agglomeration of the propellant when chopped and allowing it to be slurried in water. The result is a rapid solution of the ammonium perchlorate oxidizer and its resulting separation from the propellant residue by filtration or decantation of the liquids. The ammonium perchlorate is removed from the filtrate by cooling and filtering the precipitated AP. The resulting lean AP solution is recycled in the extraction of more AP from another batch of propellant.

The agglomeration of the propellant is prevented by the addition of surface active agents which are absorbed upon the propellant binder surfaces, reducing the tacky nature of the exposed surfaces. The power required to mix the water slurried propellant was less than 1/50th that required to mix the pyrotechnic materials having the tacky nature of the wet agglomerated propellant and not containing the dispersing agent.

These and many other features and attendant advantages of the invention become better understood by reference to the following detailed description when considered in conjunction with the accompanying drawings.

DESCRIPTION OF THE PREFERRED EMBODIMENTS

Figure 1:
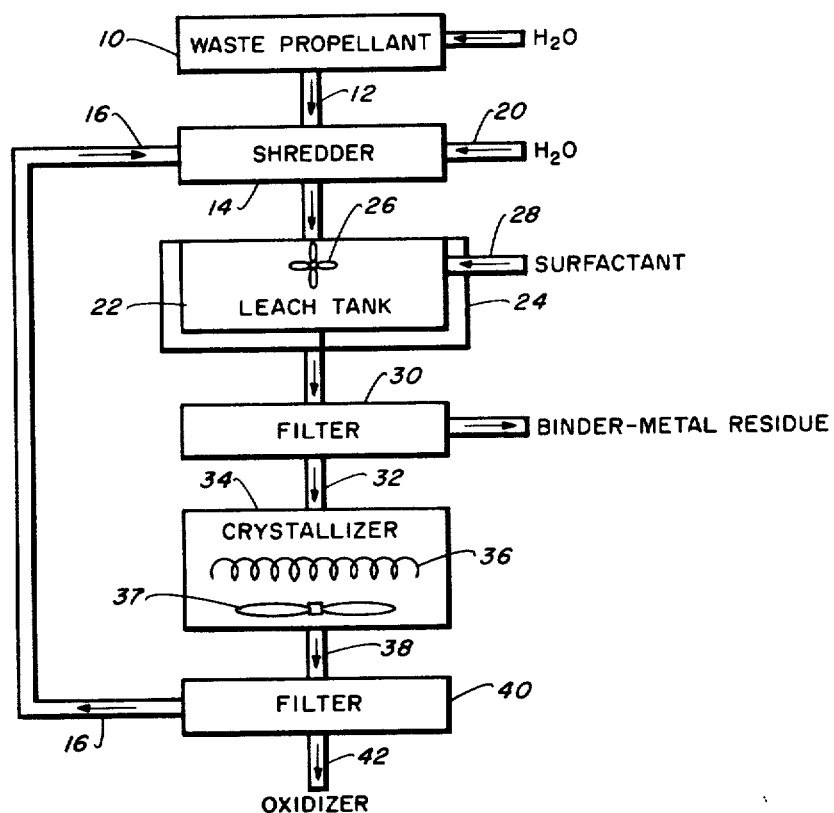
FIG. 1 is a schematic view of a waste propellant recovery system of this invention.

Most solid propellants comprise an elastomeric hydrocarbon binder containing from about 75 to 89% of solid consisting of oxidizer and particulate metal such as aluminum or zirconium interspersed in the binder. The oxidizer is generally present in an amount from 55-85% by weight and the metal powder from 0 to 30% by weight of the propellant. One of the most commonly used oxidizers is ammonium perchlorate (AP) and the process is directed to this material. However the process is equally applicable to the recovery of other inorganic salt oxidizers such as the alkali metal or ammonium nitrates or other perchlorates such as sodium or potassium perchlorate.

The binder component of the propellant includes an elastomeric hydrocarbon, curing ingredients and plasticizer. Preferred binders for solid rocket propellants are elastomeric hydrocarbon polymers formed by the chain extension and crosslinking reactions of functionally terminated liquid polybutadiene polymers. Such polymers may include carboxy-terminated polybutadiene (CTPB) cured with imines or epoxides, polybutadiene acrylonitrile-acrylic terpolymers (PBAN) cured with epoxides and hydroxy-terminated polybutadiene (HTPB) cured with diisocyanates. PBAN polymers are being utilized as the binder for the propellant for the Space Shuttle.

The binder composition may also contain a minor amount below 10% of various additives such as cure promoters, stabilizers, burning rate accelerators, thixotropic control agents, or reactive polymeric modifiers such as one or more diols or polyols. The isocyanate is generally present in at least an equivalent amount sufficient to react with the hydroxy prepolymer and hydroxyl substituted modifiers.

The current Space Shuttle Baseline Propellant has the following approximate composition:

TABLE 1

| Ingredient | % by weight |
|---|---|
| Solids | 86.00 |
| AP | 69.60 |
| Al | 16.00 |
| $Fe_2O_3$ | 0.40 |
| PBAN* | 14.00 |

*cured with an epoxy (DER-331)

The process of the invention comprises the steps of shredding the waste propellant into fragments so as to expose the oxidizer crystals encapsulated in water-insoluble binder to the leach solution. The fragments should generally be less than 5 inches square and the thickness should be less than ½ inch. The leach solution should be warm, preferably from 130° F. to 200° F. generally from 150° F. to 180° F. The leach solution may contain a minor amount of residual oxidizer generally less than 20% by weight, suitably from 8% to 18% by weight. The amount of propellant added to the leach solution is usually at least the amount necessary to provide a solution saturated with oxidizer at the leaching temperature, generally the weight ratio of propellant to solution is from 1/1 to 1/4.

The friction reducing agents are synthetic organic surfactants having an oleophilic hydrocarbon portion that associates with the surface of the propellant particles and a hydrophilic portion to aid dispersion in the aqueous leach solution. The surfactant may be anionic, nonionic or cationic. Preferred surfactants are low molecular weight (200 to 1000) anionic surfactants, suitably alkyl polyethylene or polypropylene oxide phosphate sulfonate or phosphate detergents such as an alkyl polyethylene oxide, M.W. of about 500 or nonionic polyalkylene oxides having molecular weights from 1000 to 50,000, preferably 5,000 to 30,000 such as compounds of the formula $HO(C_nH_{2n}O)_mH$ were n is 2 or 3 and m is at least 25 such as FRA-1173 Union Carbide Corp. or Carbowax 20M Union Carbide Corp. having molecular weights of about 1,000,000 and 20,000 respectively. (The molecular weight of the FRA-1173 used was approximately 1,000,000; however, the vigorous stirring used breaks the polymer into much smaller fragments.) Other usable surfactants are polyvinyl alcohol-acetate copolymers having an acetate content below 15 percent, commonly termed polyvinylalcohols and GAFAC (General Aniline and Film Corp.) surfactants which are complex organic phosphate esters.

The addition of these materials in approximate concentrations of from 0.01% by weight, generally from 0.05 to 0.1% by weight results in water slurries of chopped propellant which remain suspended without agglomeration while being stirred with a three blade propeller type stirrer. Extraction of up to 98% AP was achieved from slurries containing over 40% propellant and at 1/50th the power required to mix slurries absent surfactant.

After stirring for 5 to 30 minutes the propellant chunks are further comminuted by the propeller into smaller (about 1/16th inch) particles which are swollen by the leach solution. The leach solution is decanted and cooled to a temperature below 80° F., suitably from 40° F. to 70° F., until the oxidizer crystallizes and precipitates. The crystals are recovered by filtration and the lean or filtered leach solution can be recycled to the leach tank and/or shredder in continuous or batch type processes.

Referring now to FIG. 1, waste propellant is fed from water flooded storage tank 10 through line 12 into shredder 14. Shredder 14 is preferably a wet rotating knife type unit. However, other size reduction machines may be utilized such as a ball mill, roller mill or pulverizer, or grinding machine. The lean oxidizer solution recyled through line 16 and makeup water from line 20 may be added to the shredder 14. The shredded slurry then flows into leach tank 22 containing a steam jacket 24 and a bladed-propeller 26. Additional surfactant is added to the leach tank through inlet 28 to make-up for losses in the process or the surfactant may be added to the shredder 14.

After suitable retention time to leach over 90% of the oxidizer from the propellant, the suspension is filtered in filter 30, to provide a fat liquor 32 delivered to crystallizer 34 and a binder-metal residue which can be further processed by air oxidation or by reactive solvent depolymerization as disclosed in commonly assigned copending application Ser. No. 947,000 entitled "Recovery of Aluminum and Binder from Composite Propellants" by Graham C. Shaw, filed concurrently herewith.

The crystallizer 34 contains cooling coils 36 which cools the fat liquor and an agitator 37 to induce crystallization. The crystal suspension is then transferred through line 38 into a separator such as a centrifuge or filter 40 from which the crystalline oxidizer 42 is recovered and the lean liquor is recycled through line 16 to the shredder 14. The crystals may be dried and stored before reuse.

Leaching of ammonium perchlorate from the propellant was conducted in a tank equipped with steam jacket and a variable speed laboratory stirring motor having a sharp, three-blade propeller. Chopped or sliced propellant cut into approximately ¼" thick by 1 inch squares was added to a heated water solution containing 14% AP and a friction reducing agent. After stirring 5 to 30 minutes the propellant chunks were further broken by the propeller into smaller (approximately 1/16") particles which were swollen by the leach solution. In a pilot plant operation, lean AP solution would be reused in a continuous leaching operation. To simulate recycling of the leach solution, the laboratory scale leach runs were made with a 14% AP solution. The amount of propellant added was adjusted to provide the amount of ammonium perchlorate required to give a saturated solution at a desired temperature, such as 150° F.

Leaching appeared to be complete within 15 minutes when conducted at 180° F. The leach solution was decanted, allowing it to drain from the swollen binder-aluminum residue. The residue was then given a fresh water wash, filtered and dried. The AP was recovered from the leach solution by cooling to 50° F., the saturation temperature of a 14% AP solution. After crystallization, the slurry was filtered and dried. The conditions and test results from various propellants containing PBAN, CTPB and HTPB binders are shown in the following table. The dispersing agents utilized were (a mixture of wetting agents consisting mainly of ammonium alkyl ethoxylates, alkylamine oxides, sodium alkyl glyceryl sulfate, ethanol, and water, FRA 1173 (a polypropylene oxide having a molecular weight of about 1 million), an anionic surfactant of a complex organic ester as an alkyl ethylene oxide phosphate ester and Carbowax 20M (a polyethylene oxide having a molecular weight of about 20,000).

ing the propellant. However, under the conditions in a 1.6 liter leach tank, the decreased swelling of the binder and aluminum residue resulted in less AP solution holdup and, consequently, an increase in the volume of leach filtrate and AP recovered from the filtrate. The RS410 was found to be one of the best of the dispersing agents in promoting the redispersion of a wet com-

TABLE II

| | AMMONIUM PERCHLORATE LEACHING OF COMPOSITE PROPELLANTS | | | | | | | | | |
|---|---|---|---|---|---|---|---|---|---|---|
| Test No. | 1 | 2 | 3 | 4 | 5 | 6 | 7 | 8 | 9 | 10 |
| Propellant | PBAN | PBAN | PBAN | PBAN | CTPB | PBAN | HTPB | HTPB | Uncured PBAN | PBAN |
| Amount (gm) | 175.5 | 244 | 270 | 171 | 180 | 171 | 370 | 1,000 | 234 | 1,000 |
| Leach Solution | | | | | | | | | | |
| Amount (gm) | 547 | 581 | 557 | 581 | 581 | 500 | 740 | 1,500 | 581 | 1,500 |
| AP Content | 14.8 | 14 | 14 | 14 | 14 | 0 | 0 | 0 | 14 | 0 |
| Dispersing Agent (gm) | 1.0 | 1.0 | 1.0 | 0.33 | 0.33 | 0.33 | 1.5 | 3.0 | 0.3 | 3.0 |
| Type | Joy | Joy | Joy | FRA 1173 | FRA 1173 | FRA 1173 | RS410 | RS410 | RS410 | Carbowax 20M |
| Temperature (°F.) | 174 | 163 | 150 | 180 | 180 | 180 | 180 | 180 | 180 | 180 |
| Leach Time (min)* | 30 | 30 | 10 | 15 | 15 | 15 | 6 | 10 | 10 | 10 |
| Recovery Parameters | | | | | | | | | | |
| Precipitation Temp, °F. | 50 | 50 | 50 | 50 | 50 | 50 | — | — | 50 | 50 |
| AP Recovery | 92 | 91 | 83 | 77 | 78 | 76.4 | — | — | 96 | 94 |
| Residue wt (% of theoretical)** | 107 | 104 | 109 | 103 | 120 | 104 | 108 | 105 | 99 | — |
| AP Content of Residue (%) | 3.3 | 1.8 | 3.9 | 3.2 | 16.4 | 4.1 | — | 5.0 | — | — |
| Overall AP Extraction Efficiency (%) | 96.7 | 98.2 | 96 | 98.6 | 92.8 | 97.6 | 96 | 98 | 96 | — |

*Includes 4 to 5 minutes propellant feed time
**Residue given water washing after filtration AP extraction efficiencies up to 95% have been obtained from a single leaching cycle. Examples given in Table II show data and recovery results from some typical AP leach runs. Combining the leaching operation with a single residue wash increased the amount of AP extracted from the propellant to over 98%. A continuous operation in which the washings would be reused, eventually ending up in the leaching operation, will increase the AP recovery to 98% or more. Also, it has been shown that the effectiveness of AP extraction from the propellant was not adversely affected by using an AP solution instead of plain water. Using this method, AP was readily removed from composite propellants containing the butadiene based polymers such as PBAN, CTPB, and HTPB binders. Both cured and uncured propellants were handled in the same leaching equipment without difficulty in obtaining a very high recovery of the AP present.

The effectiveness and characteristics of the leaching operation are greatly improved and appear to be controlled by the use of water friction reducing agents or selected wetting or dispersing agents. The absence of a dispersing agent allowed the propellant added to a leaching tank to rapidly agglomerate, balling up into a large unmanageable mass. High speed stirring with sharp impellers alone was completely ineffective in the mixing and leaching operation.

The addition of a small amount of friction reducing agents as Union Carbide's FRA1173, or other materials as polyvinyl alcohol, high molecular weight Carbowax, a detergent, and an alkylpolyethylene oxide phosphate wetting agent, were all effective in promoting dispersion of the propellant in the leaching runs. Materials such as soap, as well as trisodium phosphate, tricalcium phosphate, and a low molecular weight Carbowax 200 were not effective dispersing agents.

It appears that the most effective leach dispersing agent could vary with the conditions of operation. The Joy detergent was less effective at swelling and disperspacted binder residue. It is likely that the effectiveness of a specific dispersing agent would change with different operating conditions and equipment configuration.

The residue left from the AP extraction contains the binder and water insoluble additives such as aluminum which is in a form much more amenable to further processing for the recovery of the other propellant ingredients than was the original propellant composition. This procedure provides an economical method of propellant recovery with the advantage of both resource and energy conservation. It also provides a much safer operation of recovery than several methods studied which often involved the use of flammable solvents in degradation reactions with the binders to obtain the release of the solids.

An analysis of the AP recovered from the leach runs is tabulated in Table III, along with a comparison with the specification for Minuteman TP-H1011 propellant. The results from other analyses such as emission spectrophotometry, for trace materials, indicate a higher than normal potassium content of 253 ppm, with other metal contents appearing typical for the AP used in propellants. From a chemical purity standpoint, the recovered AP is acceptable for reuse in propellant compositions.

TABLE III

| ANALYSES OF RECLAIMED AMMONIUM PERCHLORATE | | |
|---|---|---|
| | Reclaimed From TP-H1011 Propellant** | Specifications for TP-H1011 Propellant |
| Sulphated Ash as $MSO_4$* (%) | 0.114 | 0.90 max |
| Iron as $Fe_2O_3$ (ppm) | 3.4 | 36.00 max |
| Chlorate as $NaClO_3$ (%) | 0.001 | 0.01 max |
| Chloride as $NH_4CL$ (%) | 0.003 | 0.155 |

TABLE III-continued

ANALYSES OF RECLAIMED AMMONIUM PERCHLORATE

|  | Reclaimed From TP-H1011 Propellant** | Specifications for TP-H1011 Propellant |
|---|---|---|
| Perchlorate as NH$_4$ClO$_4$ (%) | 98.75 | 98.3 |

*Any metal sulfate
**First Stage Minuteman propellant

The AP leach and extraction rates, product purity, and recovery percentages obtained in the bench scale tests were excellent. They indicate the feasibility of recovery of high quality AP from waste composite propellant. Based on the results obtained from these bench scale tests, the design of a pilot plant was investigated. The economics of reclaiming AP from this designed pilot plant were then calculated and showed a net profit not including the savings resulting from eliminating the cost of disposing waste propellant by burning.

Figure 2:
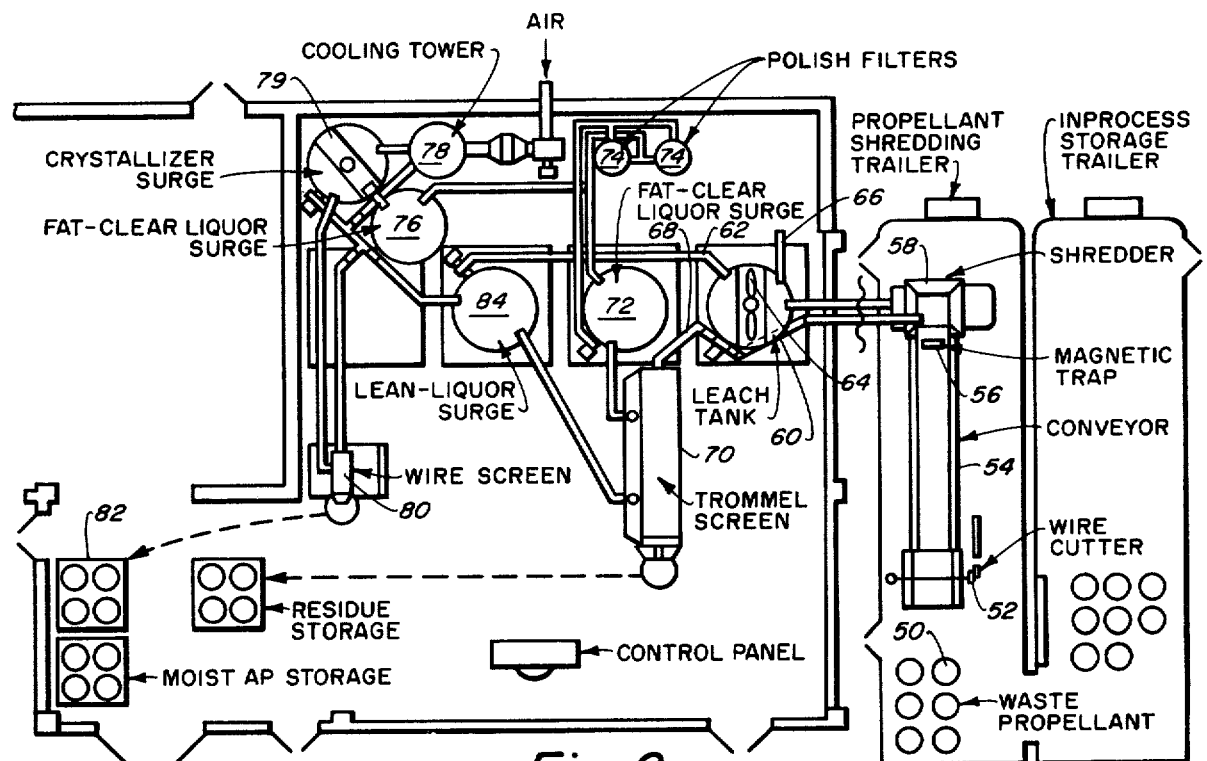
FIG. 2 is a plan drawing of a pilot plant waste propellant ingredient-reclamation system according to this invention.

The pilot plant system shown in FIG. 2 is designed to process 1,300 lb of waste propellant per hour and yield 847.7 lb of moist, high purity AP crystals per hours.

The propellant will enter as cured or uncured waste, be removed from the containers 50, and processed through the wire cut station 52. Here the propellant will be reduced to less than a 12×20 in. cross section.

The propellant pieces will then fall into a water flooded, inclined conveyor 54 where they will be retained under water until needed. The conveyor 54 will feed the propellant past a magnetic trap 56 to the shredder 58 where, under a water flood, it will be reduced to less than ¼ in. size and washed into the leach tank 60. Hot recycled lean liquor will be added through line 62 and violent agitation will be maintained by impellers 64.

The agitation will break up the residue into smaller particles and accelerate the leaching or dissolving of the AP by the hot water. A detergent or friction reducer will be added at this point through inlet 66 to prevent agglomeration of the propellant residue pieces.

The residue and fat hot liquor then will be pumped through outlet line 68 to a trommel screen 70 where the residue will be separated from the liquor and washed with fresh hot water. The residue will then be collected in drums for further processing or landfill disposal.

The hot liquor will be pumped from a surge tank 72 through a polishing filter 74 where the residual solids will be removed and a "gin clear" fat liquor sent to the crystallization surge tank 76.

Since the process is based on the differential solubility of AP in water at different temperatures, the reduction of the temperature of the fat liquor results in precipitation of AP crystals. The yield is substantial, since a 60° F. temperature drop in the crystallizer will yield 13% AP by weight. Cooling will be accomplished in the crystallization step by blowing filtered air up through a cooling tower 78 while the fat liquor trickles down through it. The tower will be designed with a special coating on the wetted parts to help the tower to be self cleaning. An occasional flush with hot water to remove stubborn AP crystal buildup probably still will be required.

The AP crystals will be separated from the lean liquor in crystallizer surge tank 79 by a dewatering screen 80. The damp AP will be placed in polyethylene bags inside steel drums for shipment to an AP processing plant. The lean liquor sorted in lean liquor surge tank 84 will be returned to the process where it will be reheated and used on fresh shredded propellant. A material balance is presented in the following table.

TABLE IV

AMMONIUM PERCHLORATE PILOT RECOVERY SYSTEM MATERIAL BALANCE

| Unit Operation | Solution | | | | Ammonium Perchlorate | | Residue (lb/min) |
|---|---|---|---|---|---|---|---|
| | Temp (°F.) | gpm | Lb H$_2$O Min | AP Conc (wt %) | Solid (lb/min) | In sol. (lb/min) | |
| Leach | | | | | | | |
| Feed in (solid) | 100 | — | — | 70.0 | 16.58 | — | 6.964 |
| Lean liquor in | 190 | 6.1 | 41.7 | 24.7 | — | 13.68 | — |
| Slurry out | 190 | 7.16 | 41.7 | 41.8 | 0.33 | 29.93 | 6.964 |
| Trommel Screen | | | | | | | |
| Feed in | 185 | 7.16 | 41.7 | 41.8 | 0.33 | 29.93 | 6.964 |
| Wash in | 190 | 1.0 | 8.34 | — | — | — | — |
| Fat dirty liquor out | 182 | 6.86 | 39.43 | 41.8 | — | 29.21 | 0.14 |
| Residue out | 180 | 0.2 | 2.28 | 8.3 | 0.33 | 0.288 | 0.824 |
| Wash out | 180 | 1.0 | 8.34 | 4.9 | — | 0.432 | — |
| Filter | | | | | | | |
| Fat dirty liquor in | 190 | 6.86 | 39.43 | 41.8 | — | 29.21 | 0.14 |
| Fat clear liquor out | 185 | 6.80 | 39.43 | 41.8 | — | 29.21 | — |
| Residue out | 185 | — | — | 8.3 | — | — | 0.14 |
| Crystallizer | | | | | | | |
| Fat clear liquor in | 185 | 6.86 | 39.48 | 41.8 | — | 29.21 | — |
| Air stream in | 100 | 5,000 cfm | 4.28 | — | — | — | — |
| Lean liquor slurry out | 100 | 6.39 | 35.2 | 24.7 | 17.66 | 11.55 | — |
| Air stream out | 100 | 5,000 | 8.39 | — | — | — | — |
| Dewatering Screen | | | | | | | |
| Lean liquor slurry in | 100 | 6.39 | 35.2 | 24.7 | 17.66 | 11.55 | — |
| Lean liquor out | 100 | 4.75 | 33.4 | 24.7 | — | 10.96 | — |

TABLE IV-continued
AMMONIUM PERCHLORATE PILOT RECOVERY SYSTEM MATERIAL BALANCE

| | Solution | | | | Ammonium Perchlorate | | |
|---|---|---|---|---|---|---|---|
| Unit Operation | Temp (°F.) | gpm | Lb H$_2$O Min | AP Conc (wt %) | Solid (lb/min) | In sol. (lb/min) | Residue (lb/min) |
| Damp AP crystals out | 100 | 0.2 | 1.8 | 88.6 | 17.66 | 0.59 | — |

Assume
70% AP in propellant
98% AP in solution
25% water loss in residue
15% water loss in AP
Air into cooler 30% RH 100° F.
Air out of cooler 80% RH 90° F.
2% solids (residue) in fat dirty liquor The AP leach and extraction rates, product purity, and recovery percentages experienced in the bench scale tests were excellent. They indicate the feasibility of recovery of high quality AP from composite waste propellant.

As a spinoff of these tests the technical possibilities of the following are indicated:

1. Treatment of caked or lumpy AP.
2. Recovery of AP from case reclamation operations.
3. Deactivation of residues to make them suitable for landfill if no other use can be justified for them.
4. Drying of the AP to make it suitable for use in at least the ground fraction of propellant formulations.
5. A product that is marketable to existing AP producers. The sale of moist, pure AP crystals to an AP producer would allow him to bypass the most expensive steps in his process, which are the chlorate cells, perchlorate cells, the addition of anhydrous ammonia and hydrochloric acid. The AP could be added just ahead of the crystallizers.
6. Sale of moist or dry AP to perchloric acid producers.
7. The recovered AP could also be used in the production of slurried exposives.

It is to be realized that only preferred embodiments of the invention have been described and that numerous substitutions, modifications and alterations are permissible without departing from the spirit and scope of the invention as defined in the following claims.

What is claimed is:

1. A method of recovering a water soluble oxidizer from particles of solid propellant containing the oxidizer dispersed in an organic, elastomeric hydrocarbon binder comprising the steps of:
   forming a slurry of the particles in an aqueous leach solution containing at least 0.01% by weight of a synthetic organic surfactant having an oleophilic portion that associates with the surface of the propellant particles and a hydrophilic portion to aid dispersion in the aqueous leach solution whereby said surfactant is capable of preventing agglomeration of the particles;
   heating the leach solution to a temperature from 130° F. to 200° F. and stirring the solution while dissolving the oxidizer into the leach solution;
   separating the leach solution from the particles; and
   crystallizing the oxidizer and recovering it from the separated leach solution.

2. A method according to claim 1 further including the step of recycling leach solution from the crystallization step to the slurrying step.

3. A method according to claim 1 in which the oxidizer is ammonium perchlorate and the binder is an elastomeric hydrocarbon.

4. A method according to claim 3 in which the leach solution initially contains up to 18% by weight of ammonium perchlorate and the slurry contains an amount of particles at least sufficient to form a solution saturated with ammonium perchlorate.

5. A method according to claim 1 further including the step of filtering the crystal slurry; washing and drying the crystals.

6. A method according to claim 5 in which crystallization is effected by cooling the separated leach solution to a temperature below saturation temperature.

7. A method according to claim 5 further including the step of shredding propellant to form the particles in a water flooded shredder.

8. A method according to claim 3 in which the surfactant is present in the leach solution in an amount from 0.05 to 1.0% by weight and is selected from anionic and nonionic surfactants.

9. A method according to claim 8 in which the surfactants are selected from alkyl-polyethylene oxide or alkyl-polypropylene oxide phosphates or sulfonates, polyvinylalcohols or polyalkylene oxides of the formula HO(C$_n$H$_{2n}$O)$_m$H where n is 2 or 3 and m is at least 25.

10. A method according to claim 8 in which the surfactant is an anionic surfactant having a molecular weight from 200 to 1000.

11. A method according to claim 10 in which the surfactant is an alkyl-polyethylene oxide phosphate having a molecular weight of about 500.

* * * * *